(12) United States Patent
Marple

(10) Patent No.: US 6,849,360 B2
(45) Date of Patent: Feb. 1, 2005

(54) NONAQUEOUS ELECTROCHEMICAL CELL WITH IMPROVED ENERGY DENSITY

(75) Inventor: Jack W. Marple, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 163 days.

(21) Appl. No.: 10/164,239

(22) Filed: Jun. 5, 2002

(65) Prior Publication Data

US 2003/0228518 A1 Dec. 11, 2003

(51) Int. Cl.$^7$ .......................... H01M 4/40; H01M 4/58; H01M 4/62
(52) U.S. Cl. ................. 429/231.95; 429/217; 429/221; 429/232
(58) Field of Search .......................... 429/60, 217, 221, 429/232, 231.95

(56) References Cited

U.S. PATENT DOCUMENTS

| | | | |
|---|---|---|---|
| 4,163,829 A | 8/1979 | Kronenberg | 429/194 |
| 4,764,437 A | 8/1988 | Kaun | 429/50 |
| 4,935,316 A | 6/1990 | Redey | 429/50 |
| 4,952,330 A | 8/1990 | Leger et al. | 252/62.2 |
| 5,219,683 A | 6/1993 | Webber | 429/197 |
| 5,229,227 A | 7/1993 | Webber | 429/197 |
| 5,432,030 A | 7/1995 | Vourlis | 429/197 |
| 5,514,491 A | 5/1996 | Webber | 429/194 |
| 5,691,083 A | 11/1997 | Bolster | 429/194 |

FOREIGN PATENT DOCUMENTS

| | | | |
|---|---|---|---|
| EP | 0529802 A1 | 3/1993 | H01M/6/16 |
| GB | 2160705 A | 12/1985 | H01M/6/14 |
| JP | 55154067 | 12/1980 | H01M/4/08 |
| JP | 60160566 | 8/1985 | H01M/4/58 |
| WO | 00/67338 | 11/2000 | H01M/4/58 |

*Primary Examiner*—Stephen J. Kalafut
(74) *Attorney, Agent, or Firm*—Russell H. Toye, Jr.

(57) ABSTRACT

This invention relates to a nonaqueous cell comprising a lithium metallic foil anode and a cathode coating comprising iron disulfide as the active material wherein the coating is applied to at least one surface of a metallic substrate that functions as the cathode current collector. In particular, the cell of the within invention has improved performance on high rate discharge and is achieved, surprisingly, with an anode underbalance. The cell of the within invention has an anode to cathode input that is less than or equal to 1.0. We have discovered, unexpectedly, that the energy density for the cell both volumetrically and gravimetrically can be improved by approximately 20 to 25% while only increasing the volume of the cathode coating solids by approximately 10% through a unique and novel cathode coating formulation used in conjunction with an alloyed lithium foil.

22 Claims, 1 Drawing Sheet

NONAQUEOUS ELECTROCHEMICAL CELL WITH IMPROVED ENERGY DENSITY

FIELD OF THE INVENTION

Figure 1:
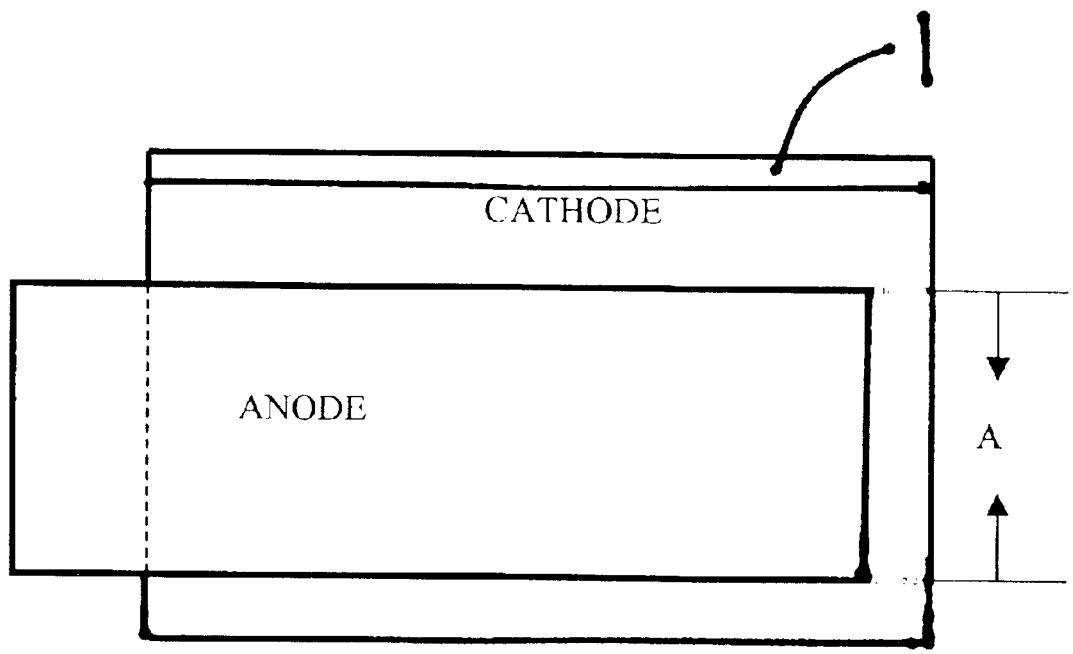

This invention relates to a nonaqueous cell, such as a cell wherein lithium is the active anode material and iron disulfide or pyrite is the active cathode material. More particularly, this invention relates to such a cell wherein the anode to cathode input ratio is less than or equal to 1.0.

BACKGROUND

The electrochemical couple of a lithium metal anode with a pyrite or iron disulfide cathode has long been recognized as a theoretically high-energy couple. Hereinafter, "pyrite" and "iron disulfide" will be used interchangeably. Lithium metal possesses the lowest density of any metal and provides a volumetric energy density of 2062 mAh/cubic centimeter and a gravimetric energy density of 3861.7 mAh/gram. Pyrite offers advantageous energy opportunities as a result of its ability to undergo a four electron reduction, and has a volumetric energy density of 4307 mAh/cubic centimeter and a gravimetric energy density of 893.58 mAh/gram.

There are however many challenges in achieving a commercially viable cell with this particular electrochemical couple. One key challenge is how to use internal cell volume efficiently. It is known that this electrochemical system results in a volume increase upon discharge and the accompanying formation of reaction products. It is therefore necessary that the cell design incorporate sufficient void volume to accommodate this volume increase. It will be appreciated then, that as the discharge efficiency of the cell increases, additional reaction products will be generated causing incremental volume increases that must be accommodated by the incorporation of sufficient void volume within the cell.

Attempts to improve the energy density of the cell by increasing the density of the cathode present additional challenges. First, it will be appreciated that an increase in the density of the cathode will result in less void volume within this electrode to accommodate the reaction products, in turn requiring that alternative void sites within the cell be provided. Further, the densification of the cathode through an increase in the calendering force applied to the coated electrode stock can result in a stretching of the metallic foil substrate that functions as the cathode current collector. Such stretching can compromise the uniformity of the coating layer and can lead to wrinkling, cracking and ultimately the separation of all or portions of the coating layer from the substrate.

In the interest of accommodating the increase in volume relating to the reaction products for the lithium/iron disulfide electrochemical couple while also improving the cell discharge efficiency and cell capacity, it will therefore be appreciated that the volume occupied by non-reactive internal cell components should be minimized to the extent possible. In this regard, use of lithium metal foil as the anode obviates the need for a discrete anode current collector, since the lithium foil is sufficiently conductive. However, lithium foil has a relatively low tensile strength and as a result can undergo stretching and thinning causing localized regions of reduced anode capacity. In a pronounced case, the thinning can be aggravated to the point of disconnects within the lithium anode. Various solutions to the problem of lithium foil weakness have been proposed, including, the design of cells with thicker lithium foils, separate anode current collectors, or lithium anodes with regions of reduced or non-ionic transport. These solutions typically result in an anode overbalance in the cell and are not efficient or volumetrically satisfactory. The use of excess lithium in the cell is also costly since metallic lithium foil is a relatively costly material.

There is therefore a need for a nonaqueous lithium/iron disulfide cell with an increased energy density and discharge efficiency that accommodates the volume increase of the reaction products generated during discharge. There is further a need for such a nonaqueous cell having a dense cathode with good adhesion to the current collector substrate without sacrificing the uniformity of the cathode coating layer. There is further a need for such a nonaqueous cell that reduces the anode to cathode cell balance without sacrificing the integrity of the anode.

DRAWINGS

FIG. 1 is an illustration of an anode and a cathode and the interfacial electrode width.

DESCRIPTION OF THE PREFERRED EMBODIMENT

This invention relates to a nonaqueous cell comprising a lithium metallic foil anode and a cathode coating comprising iron disulfide as the active material wherein the coating is applied to at least one surface of a metallic substrate that functions as the cathode current collector. In particular, the cell of the within invention has improved performance on high rate discharge and is achieved, surprisingly, with an anode underbalance. Said another way, the cell of the within invention has an anode to cathode input ratio, as defined herein, that is less than or equal to 1.0. We have discovered, unexpectedly, that the energy density for the cell both volumetrically and gravimetrically can be improved by approximately 20 to 25% while only increasing the volume of the cathode coating solids by approximately 10% through a unique and novel cathode coating formulation.

Preferably, the cathode coating formulation of the cell of the within invention is used in conjunction with a lithium metallic foil anode. The preferred anode is a lithium-aluminum alloy. The aluminum content by weight is preferably between 0.1 and 2.0 percent, and still more preferably is between 0.1 and 0.9 percent. In the preferred embodiment, the aluminum content of the lithium foil anode material is 0.5 percent. Such an alloy is available commercially from, by way of example, Chemetall Foote Corporation or FMC Corporation. We have found that the use of this alloyed material in conjunction with the cathode slurry formulation described below, enables the amount of lithium utilized in the cell to be minimized. The alloyed lithium results in an increase in tensile strength. In a cell of the within invention where, for example, the electrodes are wound together into a jellyroll electrode assembly, the increase in tensile strength in the lithium aluminum alloy translates into a material stretch of less than 0.5 percent over a 12.0 inch initial electrode length. This in turn means that anode discontinuities along the length of the wound electrode strip are minimized, contributing to an improvement in overall cell performance. We have also observed that the solid electrolyte interface film (or SEI) that forms during the initial reaction of the alloyed lithium anode with organic solvents used in the electrolyte exhibits less ionic transfer resistance than the SEI film that forms using an unalloyed lithium anode.

The cathode slurry formulation of the cell of the within invention is novel and unique in that it enables the creation of a denser cathode, an anode to cathode input ratio of 1.0 or less and an increase in the cell energy density without sacrificing the discharge efficiency of the cell or the cathode integrity or the adhesion of the dried cathode slurry to the metallic foil substrate. With regard to the cathode slurry formulation, we have discovered that proper selection of the conductive additives allows for a reduction in the amount of solvent utilized, resulting in a reduction of void volume in the final electrode coating and a denser cathode. We have further discovered that through the incorporation of certain slip agents and rheological modifiers, the calendering force required to achieve the desired cathode porosity and coating thickness can be minimized, further enabling the anode to cathode input ratio of the cell of the within invention.

The preferred cathode slurry formulation of the cell of the within invention comprises conductive carbon materials as additives. Preferably, the conductive carbon additives comprise a mixture of synthetic graphite and acetylene black. We have discovered that certain beneficial effects can be achieved by incorporating a synthetic graphite that is highly crystalline and possess an extreme anisotropic character to provide a powder with a moderate to low surface area and structure and that also has a high purity level (hereinafter referred to as "highly crystalline synthetic graphite"). The moderate to low surface area and structure are characteristics of particular importance, as reflected in BET and DBP values as defined below, since we have discovered that carbons with higher surface areas and structures tend to retain solvent, ultimately contributing to coating defects. A suitable highly crystalline synthetic graphite has a maximum impurity or ash level of 0.1 percent, a mean particle size of 9 microns and a BET surface area of approximately 10 $m^2/gm$ and a n-dibutyl phthalate, or DBP oil absorption ratio of 190 percent as per ASTM D2414 and is available commercially from Timcal Graphite as Timrex MX-15. "BET" refers to ASTM D6556, which correlates surface area with multipoint nitrogen gas adsorption. A preferred highly crystalline synthetic graphite has an impurity level of 0.01 to 0.2 percent, a mean particle size of 3.0 to 11.0 microns, a BET surface area of 3.0 to 11.0 $m^2/gm$ and a DBP ratio of 160 to 200 percent.

The acetylene black is preferably 55% compressed and is available commercially from, for example, Chevron under the product name acetylene black C55.

In the preferred cathode slurry formulation, the amount of conductive carbon additives is from 7.0 to 11.0 volume percent of the total solids content and still more preferably is from 10.0 to 10.5 volume percent of the total solids content. The "solids content" and the "solids percent" as used herein refers to the dry cathode coating formulation without consideration of the solvent, while the "wet content" and the "wet percent" refers to the cathode coating formulation taking into consideration the solvent used. We have further discovered that in determining the appropriate amount of carbon additives, the level of highly crystalline synthetic graphite should be maximized while the level of acetylene black should be minimized, to avoid undesired electrolyte retention that results in an increased difficulty in processing the electrode. Therefore, preferably the volume of highly crystalline synthetic graphite exceeds the volume of acetylene black, on both a wet and a dry or solids basis. Still more preferably, the volume of highly crystalline synthetic graphite is at least twice the volume of acetylene black, again on a wet and solids basis. In the preferred formulation, the solids volume percent of highly crystalline synthetic graphite is between 7.0 and 7.5, while the solids volume percent of acetylene black is between 3.0 and 3.5 Still more preferably, the solids volume percent of highly crystalline synthetic graphite is 7.39 and the solids volume percent of acetylene black is 3.05. On a solids weight percent basis, acetylene black is preferably from 1.0 to 3.0 percent, highly crystalline synthetic graphite is preferably from 3.0 to 6.0 weight percent.

The preferred cathode slurry formulation of the within invention further comprises at least one rheological modifier to aid in electrode processing. We have discovered that a cathode slurry comprising such a modifier with a high sensitivity to shear stress further enables the dense cathode and the anode to cathode input ratio of the cell of the within invention. Particularly desirable is an additive that will aid the slurry in retaining its viscosity while in an undisturbed state but will cause a drop in the slurry viscosity when the slurry is subjected to a relatively high shear such as can be encountered during the process of transferring the slurry from a holding tank to the electrode substrate. The preferred modifier further aids the slurry in returning to the relatively higher viscosity once the shear stress is removed. We have discovered that the incorporation of fumed silica into the cathode slurry of the cell of the within invention provides the above described shear sensitivity. The preferred silica has a silanol group surface concentration of between 0.5 and 1.0 mmol/gm, and most preferably between 0.70 and 0.80 mmol/gm. The fumed silica preferably is added in an amount of from 0.2 to 0.6 weight percent of the solids incorporated into the slurry formulation, with a bulk density of from 35.0 to 50.0 gm/liter. A suitable fumed silica additive is available commercially from, for example, Degussa Corporation and is known as Aerosil 200, having a bulk density of 45.0 to 50.0 gms/liter. In a preferred formulation, the fumed silica comprises 0.3 weight percent of the solids.

In the preferred cathode slurry formulation, micronized TEFLON®, or micronized polytetrafluoroethylene (PTFE) is incorporated as a slip agent. The micronized TEFLON® preferably has a mean particle size of 2.0 to 4.0 microns and a maximum particle size of 12.0 microns. The preferred micronized TEFLON® is easily dispersed in coating formulations and has been processed to a 1.0 to 1.5 NPIRI grind, where NPIRI stands for National Printing Ink Research Institute. Micronized TEFLON® is preferably incorporated from 0.2 to 0.6 weight percent of the total weight of the solids in the slurry, and still more preferably is added at 0.3 weight percent. A suitable preferred micronized TEFLON® is manufactured by MicroPowders Inc. and is available commercially from Dar-Tech Inc. under the name Fluo HT.

The anode to cathode input ratio as used herein can be calculated as follows:

Anode Capacity Per Linear Inch:
(foil thickness)×(interfacial electrode width)×1 inch×(density of lithium foil at 20° C.)×(lithium energy density, 3861.7 mAh/gm).

Cathode Capacity Per Linear Inch:
(final cathode coating cathode coating thickness)×(interfacial electrode width)×1 inch×(cathode dry mix density)×(final cathode packing percentage)×(dry weight percent $FeS_2$)×(percent purity FeS2)×($FeS_2$ energy density, 893.58 mAh/gm)

Anode/cathode input ratio= anode capacity per linear inch/cathode capacity per linear inch "Interfacial electrode width" as used herein is the linear dimension that shares an interfacial area between the cathode and the anode. An example is illustrated in FIG. 1, where the dimension labeled "A" is the interfacial electrode width.

"Final cathode coating thickness" refers to the coating thickness after any calendering operation or other densification processing of the cathode. "Final cathode packing percentage" refers to the solid volume percentage after any calendering operation or other densification processing and is equivalent to 100 percent less the void volume percentage after any calendering operation or other densification processing of the cathode. The "cathode dry mix density" refers to the additive density of the solid components of the cathode coating.

A preferred polymer binder for the cathode coating of the cell of the within invention is a styrene-ethylene/butylene-styrene (SEBS) block copolymer. One such suitable block copolymer is available commercially from Kraton Polymers of Houston, Tex. as Kraton G1651. The preferred solvent for use with such a binder is stabilized 1,1,2-trichloroethylene. One of skill in the art will appreciate that other combinations of binders and/or solvents may be utilized in the cathode coating of the cell of the within invention without departing from the scope of the within invention.

EXAMPLE

An electrochemical cell comprising lithium as the active anode material and pyrite as the active cathode material is constructed as follows. A continuous strip of lithium metal foil 0.006 inches thick by 1.535 inches wide and alloyed at 0.5 weight percent with aluminum is provided. An aluminum cathode current collector continuous strip 0.001 inches thick by 1.72 inches wide is provided. The aluminum cathode collector strip is full hard standard alloy 1145-H19 aluminum and both surfaces are flame cleansed to remove oils and improve adhesion of the coating to the substrate surface.

A cathode coating slurry is prepared using the following solids:

| Material | Weight percent (dry) | cm³/100 gms |
|---|---|---|
| FeS2 | 92.0 | 19.087 |
| Acetylene black | 1.4 | 0.733 |
| Highly crystalline synthetic graphite | 4.0 | 1.777 |
| Fumed silica | 0.3 | 0.136 |
| Micronized PTFE | 0.3 | 0.136 |
| Kraton | 2.0 | 2.198 |
| | | 24.067 cm³/100 gms |
| | | 4.155 gm/cm³ |

Battery grade iron pyrite with a purity level of 95 percent by weight available from Chemetall is sieved through a 230 mesh screen to remove particles with a dimension greater than 62 microns. The sieved pyrite is weighed along with conductive carbon additives and fumed silica, wetted with a 1,1,2-trichloroethylene solvent and mixed via a high speed disc mixer. Once thoroughly wetted and blended, the polymer binder is added to the mixer and blended until dissolved uniformly in the mixture. Micronized PTFE is then blended into the mixture and additional solvent is incorporated to reach a desired viscosity suitable for the particular coating operation. In this example, the final slurry viscosity is in the range of 2900 to 4100 centipoise as measured using a Brookfield Viscometer.

The slurry is then applied to both sides of the continuous cathode aluminium strip substrate in a roll coating operation. The coating is applied to the cathode substrate so as to leave an uncoated band along one edge of both sides of the substrate in the web direction that is referred to as the mass fee zone 1 as shown in FIG. 1. The wet coating is applied to a thickness of 0.00565 inches by 1.605 inches wide on each side of the cathode collector strip. After drying, the cathode strip undergoes a densification process in a calendering operation for a reduction to approximately 0.00315 inches on each side of the 0.001 inch thick substrate. The resulting cathode coating has a solids packing factor of approximately 64 percent. The anode to cathode input ratio can be determined as follows:

Cathode Capacity Per Linear Inch:
(0.0063 in.)(1.535 in.)(1.0 in.)(16.387 cm³/in³)(4.1555 gm/cm³)(0.64 solids packing) (0.92)(0.95)(893.58 mAh/gm)=329 mAh/linear inch Anode Capacity Per Linear Inch:
(0.006 in.)(1.535 in.)(1.0 in.)(16.387 cm³/in³)(0.534 gm/cm³)(3861.7 mAh/gm)=311 mAh/linear inch The resulting anode to cathode input ratio is 311/329=0.95.

The anode, cathode and a suitable separator are wound together from continuous webs into an electrode assembly with an overwrap on the exterior of the jellyroll and disposed within a can or other suitable container. A plastic insulating disc is punched and placed into each can initially. Automatic winders initiate the jellyroll with separator, followed by the cathode. The anode is introduced into the winder after the cathode and the jellyroll is formed to predetermined electrode lengths based on the location of the anode tab. The winder feed stock is separated from the web and an overwrap film is introduced into the winder at the trail end of the jellyroll and wound over the jellyroll until a predetermined jellyroll diameter is obtained. The wrap is cut and heat sealed, the cathode collector is crimped and the jellyroll is inserted into the container. The can is swaged to reduce its diameter prior to electrolyte filling.

Conventional cell assembly and closing methods are utilized to complete the final cell, followed by a predischarge regimen. The anode tab is a 0.002 inch thick nickel plated steel foil tab that is pressure bonded to the lithium foil web at predetermined intervals corresponding to the predetermined prewind anode length of 12.00 inches and is bent over the completed jellyroll prior to insertion of the jellyroll into the can. The separator is a 25 micron thick polypropylene material available from Celgard Corporation as Celgard 2400. The can is nickel plated steel with an outer diameter of 0.548 inches and the jellyroll finished diameter is 0.525 inches. The outer wrap is a polypropylene film. The electrolyte is 1.6 grams of 63.05 weight percent 1,3 dioxolane, 27.63 weight percent 1,2 dimethoxyethane, 0.18 weight percent 3,5 dimethylisoxazole, and 9.14 weight percent lithium iodide.

What is claimed is:

1. An electrochemical cell comprising a cathode assembly, said cathode assembly comprising a metallic cathode current collector having two major surfaces and a cathode coating disposed on at least one of said two major surfaces, said coating comprising iron disulfide, said cell further comprising a metallic lithium anode alloyed with aluminum, wherein the anode to cathode input ratio is less than or equal to 1.0.

2. The cell of claim 1, wherein said anode comprises less than 1.0 percent by weight of aluminum.

3. The cell of claim 2, wherein said anode comprises between 0.1 and 0.9 percent by weight of aluminum.

4. The cell of claim 3, wherein said anode comprises 0.5 percent by weight of aluminum.

5. The cell of claim 1, wherein said cathode coating further comprises a void volume of less than 43 percent.

6. The cell of claim 5, wherein said void volume is from 36 percent to 42 percent.

7. The cell of claim 6, wherein said cathode coating further comprises synthetic graphite.

8. The cell of claim 7, wherein said synthetic graphite is highly crystalline synthetic graphite.

9. The cell of claim 8, wherein said highly crystalline synthetic graphite has a mean particle size of 3.0 to 11.0 microns and a BET surface area of 3.0 to 11.0 $m^2$/gm. and a DBP of 160 to 200.

10. The cell of claim 6, wherein said cathode coating further comprises acetylene black.

11. The cell of claim 6, wherein said cathode coating further comprises a micronized polytetrafluoroethylene powder.

12. The cell of claim 11, wherein said cathode coating further comprises a styrene-ethylene-butylene-styrene block copolymer.

13. The cell of claim 12, wherein said cathode coating further comprises fumed silica.

14. An electrochemical cell comprising a cathode assembly, said cathode assembly comprising a metallic cathode current collector having two major surfaces and a cathode coating disposed on at least one of said two major surfaces, said cathode coating comprising iron disulfide, fumed silica, acetylene black and synthetic graphite, said cell further comprising a metallic lithium anode alloyed with aluminum.

15. The cell of claim 14, wherein said synthetic graphite and said acetylene black together comprise between 7.0 and 11.0 volume percent of the total solids content of said cathode coating.

16. The cell of claim 15, wherein said synthetic graphite and said acetylene black together comprise between 10.0 and 10.5 volume percent of the total solids content of said cathode coating.

17. The cell of claim 16, wherein the solids volume percent of said synthetic graphite is at least twice the solids volume percent of said acetylene black.

18. The cell of claim 14, wherein said synthetic graphite has a mean particle size of 3.0 to 11.0 microns and a BET surface area of 3.0 to 11.0 $m^2$/gm. and a DBP of 160 to 200.

19. The cell of claim 14, wherein said cathode coating further comprises a micronized polytetrafluoroethylene powder.

20. The cell of claim 19, wherein said cathode coating further comprises a styrene-ethylene-butylene-styrene block copolymer.

21. An electrochemical cell comprising a cathode assembly, said cathode assembly comprising a metallic cathode current collector having two major surfaces and a cathode coating disposed on at least one of said two major surfaces, said cathode coating comprising iron disulfide, acetylene black, highly crystalline synthetic graphite, micronized polytetrafluoroethylene, fumed silica and a styrene-ethylene-butylene-styrene block copolymer.

22. The cell of claim 21 wherein said cathode components are present in the following solids weight percents: iron disulfide 90.0 to 94.0 percent; acetylene black 1.0 to 3.0 percent; synthetic graphite 3.0 to 6.0 percent; polytetrafluoroethylene 0.2 to 0.6 percent; silica 0.2 to 0.6 percent; SEBS block copolymer 1.5 to 3.0 percent.

* * * * *